(12) United States Patent
Valentini

(10) Patent No.: US 7,234,733 B2
(45) Date of Patent: Jun. 26, 2007

(54) DEVICE FOR REGULATING THE SUCTION FLOW IN A FLEXIBLE CONNECTION PIPE BETWEEN A TOOL FOR MACHINING SURFACES AND A MACHINING DUST SUCTION UNIT

(76) Inventor: Guido Valentini, Via Gioberti, 2, Milan (IT) I-20123

( * ) Notice: Subject to any disclaimer, the term of this patent is extended or adjusted under 35 U.S.C. 154(b) by 119 days.

(21) Appl. No.: 11/049,801

(22) Filed: Feb. 3, 2005

(65) Prior Publication Data

US 2005/0200131 A1 Sep. 15, 2005

(30) Foreign Application Priority Data

Mar. 12, 2004 (IT) .......................... MI2004A0471

(51) Int. Cl.
*F16L 37/18* (2006.01)
(52) U.S. Cl. .......................... 285/314; 285/7; 285/317; 403/348; 403/350; 15/321; 15/334
(58) Field of Classification Search .................... 285/7, 285/14, 145.2, 148.23, 314, 396, 401, 402, 285/277, 282, 284.1, 276, 317; 403/348–350; 15/312.2, 314–315, 321, 334–335
See application file for complete search history.

(56) References Cited

U.S. PATENT DOCUMENTS

| | | | | |
|---|---|---|---|---|
| 1,786,825 A | * | 12/1930 | Comer | 285/314 |
| 3,986,737 A | * | 10/1976 | Krusche | 285/341 |
| 5,692,856 A | * | 12/1997 | Newman et al. | 403/352 |
| 6,126,359 A | * | 10/2000 | Dittrich et al. | 403/349 |

* cited by examiner

*Primary Examiner*—Aaron Dunwoody
*Assistant Examiner*—Fannie C. Kee
(74) *Attorney, Agent, or Firm*—Arnold B. Silverman; Eckert Seamans Cherin & Mellott, LLC

(57) ABSTRACT

A device for regulating the suction flow in a flexible connection pipe between a tool for machining surfaces and a machining dust suction unit. The device includes a tubular terminal connector fitted with internal threading for attaching the flexible pipe and at least one side opening on the external surface. The device also includes a hollow cylindrical body that rotatably embraces at least one portion of the terminal connector and is fitted on its external surface with at least one opening that can be adjusted angularly in relation to the opening of the terminal connector.

6 Claims, 1 Drawing Sheet

DEVICE FOR REGULATING THE SUCTION FLOW IN A FLEXIBLE CONNECTION PIPE BETWEEN A TOOL FOR MACHINING SURFACES AND A MACHINING DUST SUCTION UNIT

BACKGROUND OF THE INVENTION

1. Field of the Invention

The present invention refers to a device for regulating the suction flow in a flexible connection pipe between a tool for machining surfaces and a machining dust suction unit.

2. Background Information

Devices for regulating the suction flow that can be coupled to a tool for machining surfaces are known.

In addition flexible pipes suitable for the connection of a tool to a suction unit located at a distance are also known.

The object of the present invention is to produce a device for regulating the suction flow that can be removably coupled, both to the tool and to the flexible pipe.

BRIEF SUMMARY OF THE INVENTION

In accordance with the invention this object is achieved with a device for regulating the suction flow in a flexible connection pipe between a tool for machining surfaces and a machining dust suction unit, characterised in that it comprises a tubular terminal connector fitted with internal threading for attaching to the flexible pipe and at least one side opening on the external surface, and a hollow cylindrical body, that rotatably embraces at least one portion of said terminal connector and is fitted on its external surface with at least one opening adjustable angularly in relation to said opening of the terminal connector.

The characteristics of the present invention will appear even more evident from the following detailed description of an embodiment thereof illustrated as non-limiting example in the enclosed drawings, in which:

DESCRIPTION

Figure 1:
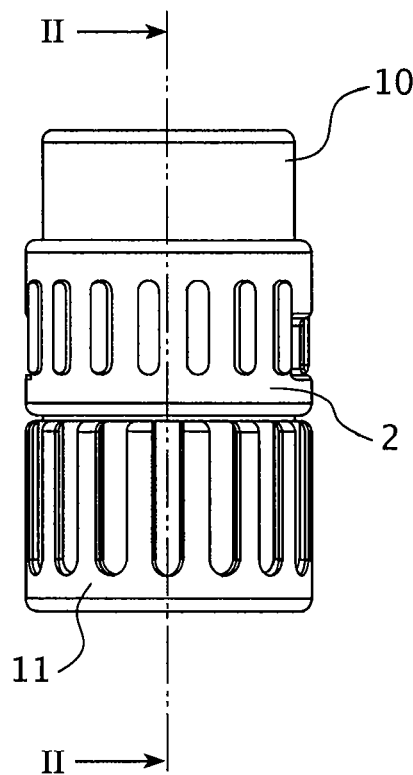
FIG. 1 shows a side view of the device according to the present invention.
Figure 2:
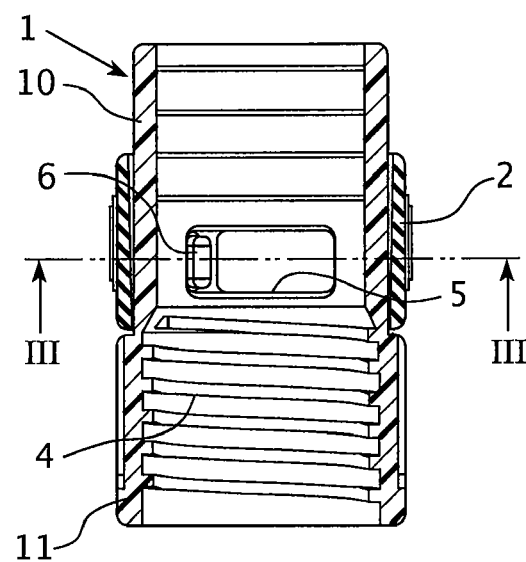
FIG. 2 shows a section view according to line II-II of FIG. 1.

A device for regulating the suction flow comprising a terminal connector 1 rotatably embraced by a cylindrical body 2 is shown in the drawings.

Said terminal connector 1 presents two openings 3 on the external surface of a first portion 10 and an internal female threading 4 on a second portion 11 which has a transverse section greater than the part embraced by the cylindrical body 2. Said female threading is suitable for the removable connection of the connector 1 with one end of a flexible connection pipe between a tool and a suction unit.

In addition said cylindrical body 2 has a pair of openings 5 similar to those of the terminal connector 1 and also presents a pair of pins 6 turned towards the inside that engage in said openings 3 so that the body 2 is blocked axially and an angle of maximum rotation of the body 2 is defined in relation to the connector 1.

Figure 4:
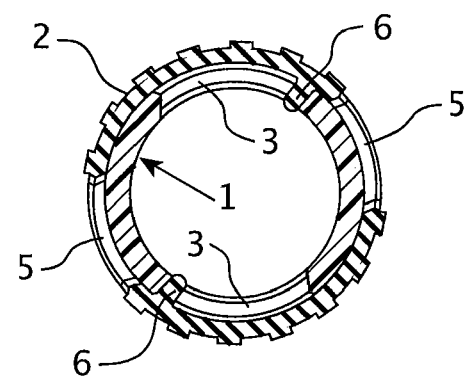
FIG. 4 shows a section view similar to that of FIG. 3 but with the device in closed position.

As regards its operation, when the device is in closed position (FIG. 4), that is the body 2 is rotated in relation to the connector 1 so that the same body 2 covers the openings 3, the air flows without any obstacle from a tool connected to the device at the non-threaded part towards a flexible pipe screwed onto the threading 4, that conveys the machining dust towards a suction unit.

Figure 3:
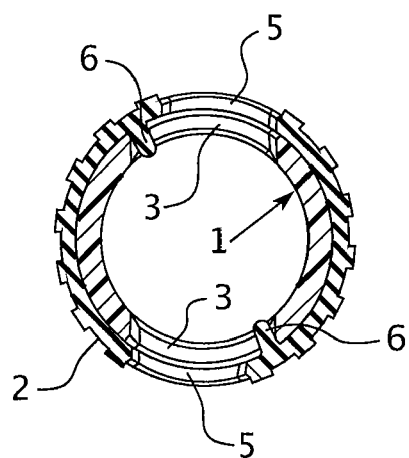
FIG. 3 shows a section view according to line III-III of FIG. 2 with the device in maximum opening position.

If the flow of air has to be limited by varying the local vacuum, the body 2 can be rotated manually in relation to the connector 1 so as to partially or completely overlay (FIG. 3) the openings 3 and 5, according to the needs.

The assembly of the device is very easy since, while the material of the body 2 is rigid, preferably plastic, the material of the connector 1 is flexible, preferably rubber. Deforming thus the connector 1 it can be made to be embraced by the body 2 by inserting the pins 6 in the openings 3.

The extreme simplicity and effectiveness of the device is to be highlighted.

As already mentioned above, the portion 11 of the connector 1 with the threading 4 has a greater transversal section than the portion 10 embraced by the body 2. More generally, it can be said that said transversal section having the threading 4 can be of various diameters, such, that is, to be adapted to flexible pipes of various dimensions.

This means that connectors 1 can be produced in series with ends of various dimensions, which according to the case will be used according to the flexible pipe to be connected. Thus for the same tool there are various connection possibilities. In accordance with the suction flow capacity required and the suction unit in possession, the most suitable connector 1 will be selected.

The invention claimed is:

1. A device for connecting a tool for machining surfaces to a flexible connection pipe of a machining dust suction unit, characterized in that said device comprises a tubular connector (1) formed by a first portion (10) with a standard cross-section for attachment to the tool and with at least one side opening (3) on the external surface rotatably embraced by a hollow cylindrical body (2) with at least one opening (5) that can be adjusted angularly in relation to said opening (3) of said first portion (10) for regulating the suction flow, and by a second portion (11) with an internal threading (4) for attachment to said flexible pipe, said second portion (11) having a cross-section depending on the cross-section of said flexible pipe.

2. The device according to claim 1, characterized in that said tubular connector (1) presents two openings (3) on its side surface and in that said cylindrical body (2) presents two openings (5) on its external surface.

3. The device according to claim 1, characterized in that said hollow cylindrical body (2) comprises stopping elements (6) for an axial block and to define an angle of maximum rotation of said hollow cylindrical body (2) in relation to the tubular connector (1).

4. The device according to claim 3, characterized in that said stopping elements consist of a couple of pins (6) integral with the hollow cylindrical body (2) and engageable in said at least one opening (3) of the tubular connector (1).

5. The device according to claim 1, characterized in that said tubular connector (1) is of rubber.

6. The device according to claim 1, characterized in that said cylindrical body (2) is of plastic.

* * * * *